United States Patent [19]
Opheij et al.

[11] 4,270,045
[45] *May 26, 1981

[54] APPARATUS FOR READING AN OPTICAL RADIATION-REFLECTING INFORMATION CARRIER FOR CONTROLLING FOCUS

[75] Inventors: Willem G. Opheij; Peter F. Greve, both of Eindhoven, Netherlands

[73] Assignee: U.S. Philips Corporation, New York, N.Y.

[*] Notice: The portion of the term of this patent subsequent to Jan. 16, 1996, has been disclaimed.

[21] Appl. No.: 834,243

[22] Filed: Sep. 19, 1977

[30] Foreign Application Priority Data
Jun. 20, 1977 [NL] Netherlands .................. 7706753

[51] Int. Cl.³ .................. H04N 5/76; G01J 1/36
[52] U.S. Cl. .................. 250/204; 358/128.5
[58] Field of Search .................. 250/201, 204; 358/128

[56] References Cited

U.S. PATENT DOCUMENTS

| | | | |
|---|---|---|---|
| 3,974,327 | 8/1976 | Dijk | 250/201 X |
| 3,992,575 | 11/1976 | Velzel et al. | 250/201 X |
| 4,010,317 | 3/1977 | Bouwhuis | 250/201 X |
| 4,135,207 | 1/1979 | Greve et al. | 358/128 |

*Primary Examiner*—Robert Segal
*Attorney, Agent, or Firm*—Thomas A. Briody; William J. Streeter; Algy Tamoshunas

[57] ABSTRACT

An apparatus as described for reading an optical radiation-reflecting information carrier, which apparatus comprises an opto-electronic focussing error detection system with two focussing detectors. The path of the read beam which has been reflected by the information carrier and which originates from the read spot includes a single radiation-deflecting element, in such a way that the radiation which is incident on this element is deflected towards the focussing detectors.

6 Claims, 1 Drawing Figure

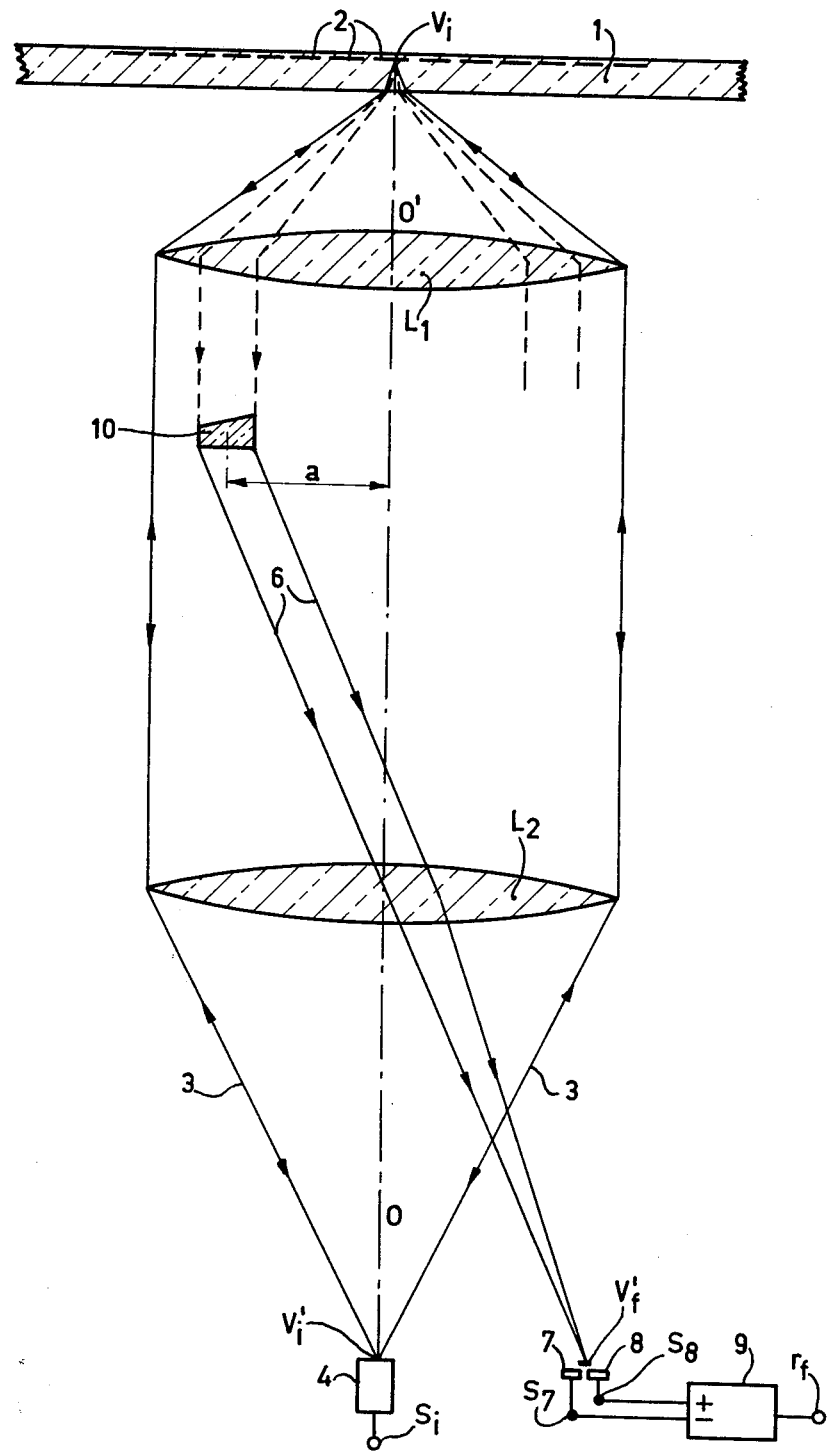

APPARATUS FOR READING AN OPTICAL RADIATION-REFLECTING INFORMATION CARRIER FOR CONTROLLING FOCUS

The present Application is an Addition to the Applicant's previous U.S. Patent Application Ser. No. 811,612, filed June 30, 1977 and now U.S. Pat. No. 4,135,207, issued Jan. 16, 1979, which previous Application describes an apparatus for reading an optical radiation-reflecting information carrier. The apparatus comprises a radiation source which supplies a read beam, an objective system for focussing the read beam to a read spot on the information structure of the information carrier and for imaging the read spot on a radiation-sensitive information detector whose output signal represents the information, and an opto-electronic focussing error detection system for determining a deviation between the desired and the actual position of the plane of focussing of the objective system. The focussing error detection system comprises two radiation-sensitive focussing detectors and a radiation-deflecting element which is disposed on one side of the optical axis of the objective system, the surface area of said element being substantially smaller than the cross-sectional area of the read beam.

The radiation-deflecting element ensures that a small portion of the read beam is diverted into a direction other than that of the rest of this beam. The narrow beam formed with the aid of the radiation-deflecting element (the focussing beam) is focussed to a radiation spot (the focussing spot) on an assembly of two focussing detectors. The degree of symmetry of the focussing spot relative to the focussing detectors provides an indication of the degree of focussing of the read beam on the information surface of the information carrier.

In the embodiments of such an apparatus described in the Patent Application Ser. No. 811,612 the radiation-deflecting element is disposed so that a portion is diverted from the read beam which is directed towards the information carrier, which portion forms a separate radiation spot on the information structure and that this additional radiation spot is imaged on the two focussing detectors.

The deflection angle of the radiation deflecting element cannot be very large because the read spot and radiation spot formed on the information structure should not be spaced too far from each other to ensure that a correct focussing of the read beam is also maintained in those cases in which the information carrier is disposed obliquely relative to the optical axis or in which the thickness of the information carrier varies. In order to ensure that the focussing spot and the re-imaged read spot are also spaced sufficiently far apart in the case that the optical pathlength of the optical read system is small, in accordance with the previous Patent Application, a second radiation-deflecting element should be included in the path of the narrow beam which is formed by the first radiation-deflecting element and reflected by the information carrier.

When two radiation-deflecting elements are employed these elements must be correctly aligned relative to each other. Moreover, the elements together must be correctly aligned relative to the objective system. This is because the second radiation-deflecting element must be disposed in the shadow of the first radiation-deflecting element. The additional alignment procedure renders assembly of the read apparatus more labor intensive and intricate.

The present invention provides an embodiment of the afore-mentioned focussing error detection system for a read apparatus, in which an adequate separation between the focussing spot and the re-imaged read spot is assured with the aid of only one radiation-deflecting element, whose position is not very critical.

The apparatus in accordance with the invention is characterized in that only one radiation-deflecting element is provided, which element is disposed in the path of the read beam which has been reflected by the information carrier and which originates from the read spot, in such a way that the radiation which is incident on the radiation deflecting element is deflected to the focussing detectors.

The apparatus in accordance with the invention employs only one radiation spot on the information and for deriving a focussing error signal. The area of the information structure on which the read beam is focussed is then always the area being read.

It is not until after the read beam has been reflected by the information carrier that a portion of this beam is diverted from the rest of the beam and is directed at the focussing detectors. The degree of symmetry of the focussing spot formed on the focussing detectors relative to these detectors is again determined by the degree of focussing of the read beam on the information surface of the information-carrier.

The invention will now be described in more detail with reference to an embodiment of an apparatus in accordance with the invention, in which the radiation source and the information detector form a unitary assembly.

The FIGURE shows a part of a round disc-shaped record carrier 1 in radial cross-section.

The information structure is for example a phase structure and comprises a multitude of concentric or quasi-concentric tracks 2, which tracks consist of a sequence of areas and intermediate areas. The areas may for example be situated at a different level in the information carrier than the intermediate areas. The information may for example be a color television program, but also other information such as a multitude of different images or digital information. Preferably, the information structure is disposed on the back of the information carrier 1.

The information carrier is illuminated by a read beam 3 which is produced by a diode laser 4. An objective system, which may comprise one lens, or as is shown in FIG. 1, two lenses $L_1$ and $L_2$, focusses the read beam to a read spot $V_i$ on the information structure. The read beam 3 is then reflected by the information structure and, as the information carrier rotates, is modulated in accordance with the information which is contained in a track portion to be read. After reflection the read passes through the objective system for a second time, an image $V'_i$ of the read spot $V_i$ being formed. At the location of the image of the spot $V'_i$ a detector is mounted, which converts the modulated read beam into an electrical signal $S_i$.

As is described in the published German Patent Application Ser. No. 2.244.119 it is possible if the radiation source is a diode laser to use this diode laser also as detector. This is the case in the apparatus of FIG. 1, where 4 is a radiation-source/Detection unit. Depending on the intensity of the reflected read beam, the electrical resistance across the diode laser or the intensity of the radiation emitted from the rear of the diode laser will vary. When a diode laser is employed as radiation source, no beam splitting element is needed to separate the modulated beam from the information carrier from the unmodulated/read beam which is directed towards the information carrier.

In accordance with the invention a small optical wedge 10 is disposed in the path of the read beam 3. This wedge diverts a sub-beam or focussing beam 6 from the read beam which has been reflected by the information carrier. The dashed lines in FIG. 1 indicate which part of the read beam passes through the wedge. The lenses $L_1$ and $L_2$ ensure that the focussing beam 6 is concentrated to a radiation spot or focussing spot $V'_f$ on the focussing detectors. The wedge 10 also diverts a part from the read beam which is directed towards the information carrier. However, this part is focussed to an additional radiation spot to the right of the read spot $V_i$ on the information structure. The additional radiation spot is re-imaged by the lens system $L_1 L_2$ in a position to the left of the optical axis $00'$, i.e. not on the focussing detectors.

The optical elements are aligned so that if the distance between the plane of the information tracks 2 and the objective system $L_1 L_2$ is correct, the radiation which is incident on the optical wedge has the direction indicated by the dashed lines in the FIGURE. The optical wedge then deflects the focussing beam 6 so that the focussing spot is symmetrical relative to the focussing detectors. These focussing detectors then receive equal amounts of radiation and the output signals $S_7$ and $S_8$ of the detectors 7 and 8 are then equal.

If the plane of the information structure moves relative to the objective system $L_1 L_2$ the convergence of the read beam which is reflected by the information carrier will change. As a result of this, the part of the read beam which is employed as focussing beam will be incident on the wedge 10 at an angle other than that indicated in the FIGURE. Consequently, the direction of the beam 6 which passes through the wedge 10 also changes and thus the position of the focussing spot $V'_f$ relative to the focussing detectors. If the plane of the information structure moves towards the objective system, the detector 7 will receive more radiation than the detector 8. However, if the plane of the information structure moves away from the objective system, the detector 7 will receive less radiation than the detector 8.

The signals $S_7$ and $S_8$ are applied to an electronic circuit 9. In this circuit the signals are subtracted from each other and processed into a focussing control signal $r_f$ in a manner known per se. By means of the last-mentioned signal the objective system may for example be moved along the optical axis $00'$ until the signals $S_7$ and $S_8$ are equal to each other. If the radiation source is a diode laser and this laser together with the objective system and the focussing detectors is accommodated in one small and light tube, the complete tube can be moved along the optical axis so as to correct the focussing.

Preferably, the distance a between the center of the wedge 10 and the optical axis $00'$ is equal to approximately 0.7 times the radius of the read beam at the location of the wedge. In the case of a variation of the thickness of the information carrier, the influence of the spherical aberations in the objective system on the shape of the spot $V'_i$ is then minimal.

Furthermore, the line separating the focussing detectors preferably makes an acute angle, of for example 45°, with the direction in which the radiation spot formed in the plane of the focussing detectors moves upon a change in the position of the plane of the information structure. Thus, it is avoided that the derived focussing control signal is greatly dependent on the position, in the said direction, of the focussing detectors. During assembly of the read apparatus the focussing error detection system can then readily be adjusted. By rotating the wedge 10 about the optical axis $00'$, the focussing spot $V'_f$ can be adjusted for symmetry relative to the focussing detectors in the case of a correctly focussed read beam.

As the wedge 10 is disposed in the path of the read beam which is directed towards the information carrier, the read spot will be slightly elongated in the direction of the line of interconnection between the center of the wedge and the optical axis. The resolution of the read beam in this direction is then slightly smaller than in the direction perpendicular thereto. The influence of this in itself minor effect on the information read-out can further be reduced by ensuring that the line of interconnection between the optical axis and the optical wedge makes an angle of approximately 45° with the direction of a track portion to be read.

The fact that the invention has been described on the basis of a wedge as radiation-deflecting element does not mean that the invention is limited to such a wedge. Instead of a wedge it is also possible to use another radiation-deflecting element, such as a diffraction grating.

Steps may also be taken to ensure that the focussing beam 6 is diverted into a direction opposite to that shown in the FIGURE, so that the focussing detectors can be arranged on the same side of the optical axis $00'$ as the radiation-deflecting element. For this purpose, the wedge 10 may for example be rotated 180° about its own axis.

What is claimed is:

1. An apparatus for reading an optical radiation-reflecting information carrier having an information structure, which apparatus comprises a radiation source which supplies a read beam, an objective system for focussing the read beam to a read spot on the information structure of the information carrier and for imaging the read spot on said radiation source, said radiation source also functioning as a radiation-sensitive information detector whose output signal represents the information, an opto-electronic focussing error detection system for determining a deviation between the desired and the actual position of the plane of focussing of the objective system, which focussing error detection system comprises two radiation-sensitive detectors and a single radiation-deflecting element disposed on one side of the optical axis of the objective system, the surface area of said element being substantially smaller than the cross-sectional area of the read beam, said element being disposed in the path of the read beam which has been reflected by the information carrier and which originates from the read spot and being configured to deflect a portion of said reflected read beam onto said detectors and to shift the position of the deflected radiation with respect to said detectors in response to changes in the distance between said objective and said information carrier.

2. An apparatus as claimed in claim 1, wherein the radiation-deflecting element is constituted by a diffraction-grating.

3. An apparatus as claimed in claim 1, wherein the radiation-deflecting element is constituted by an optical wedge.

4. An apparatus as claimed in claim 1, wherein the distance between the center of the radiation-deflecting element and the optical axis is substantially equal to 0.7 times the radius of the read beam at the location of the radiation-deflecting element.

5. An apparatus as claimed in claim 1, wherein the line of separation between the detectors makes an acute angle with the direction in which the radiation spot, which is formed in the plane of the detectors, moves as a result of focussing errors.

6. An apparatus as claimed in claim 1, wherein the line of interconnection between the optical axis and the radiation-deflecting element makes an angle of substantially 45° with the direction in which an information track of the information carrier is read.

* * * * *